US006739790B1

(12) United States Patent
Crudele

(10) Patent No.: US 6,739,790 B1
(45) Date of Patent: May 25, 2004

(54) SHAFT ASSEMBLY SAFETY MECHANISM

(75) Inventor: Walter Crudele, Middlebury, CT (US)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 10/319,248

(22) Filed: Dec. 13, 2002

(51) Int. Cl.[7] .............................. F16B 7/04; F16B 2/02
(52) U.S. Cl. ...................... 403/290; 403/14; 403/109.6; 403/235; 403/316; 403/317; 403/329; 403/155; 403/397; 403/398
(58) Field of Search ................................ 403/1, 11–14, 403/109.1, 109.6, 196, 235, 280, 282, 290, 315–318, 321, 324, 155, 398, 397, 329

(56) References Cited

U.S. PATENT DOCUMENTS

| 3,669,477 | A | * | 6/1972 | Ulich ........................... 403/372 |
| 3,709,531 | A | * | 1/1973 | Beehler ........................ 403/372 |
| 5,253,949 | A | * | 10/1993 | Oxley et al. ................. 403/317 |
| 5,560,257 | A | * | 10/1996 | DeBisschop et al. ......... 74/492 |
| 6,155,739 | A | * | 12/2000 | Sekine et al. ................. 403/12 |

* cited by examiner

Primary Examiner—Lynne H. Browne
Assistant Examiner—Victor MacArthur
(74) Attorney, Agent, or Firm—Michael Best & Friedrich LLP

(57) ABSTRACT

A shaft coupling assembly comprising a coupling element including a shaft receiving slot and retainer receiving aperture adjacent the shaft receiving slot; a retainer extendable through the retainer receiving aperture; and an axial shaft body configured to be inserted in the coupling element slot. A safety clip is configured to be retained on the coupling element with a first portion extending toward the shaft receiving slot. The first portion includes a retainer blocking edge and a pair of extensions. The first portion is moveable between an initial position wherein the blocking edge covers a portion of the retainer receiving aperture and a second position wherein the shaft body contacts the extensions and moves the edge such that the retainer receiving aperture is sufficiently clear to receive the retainer.

12 Claims, 2 Drawing Sheets

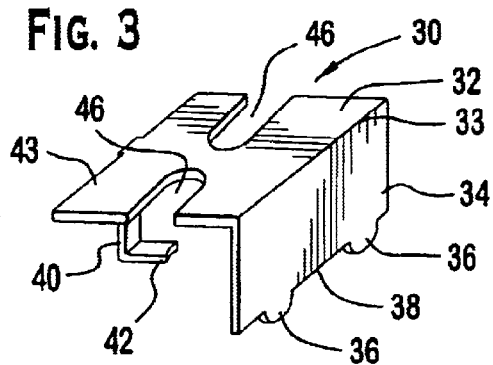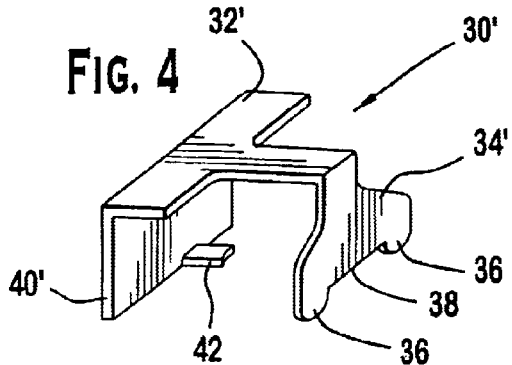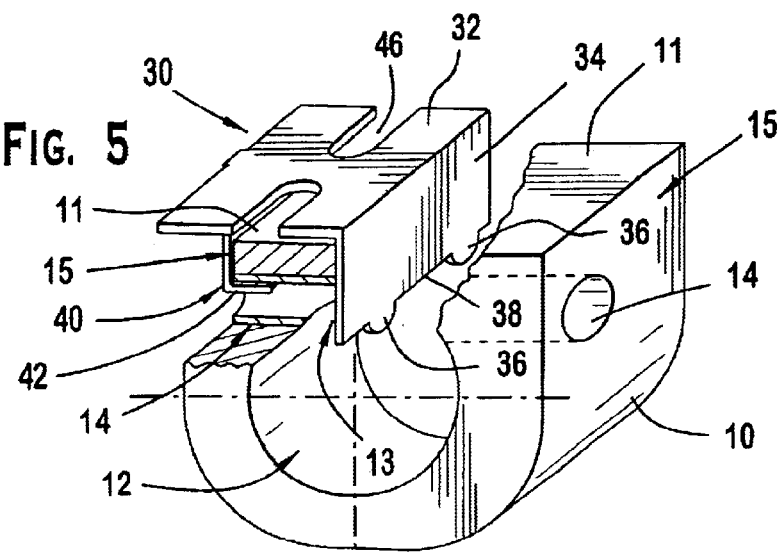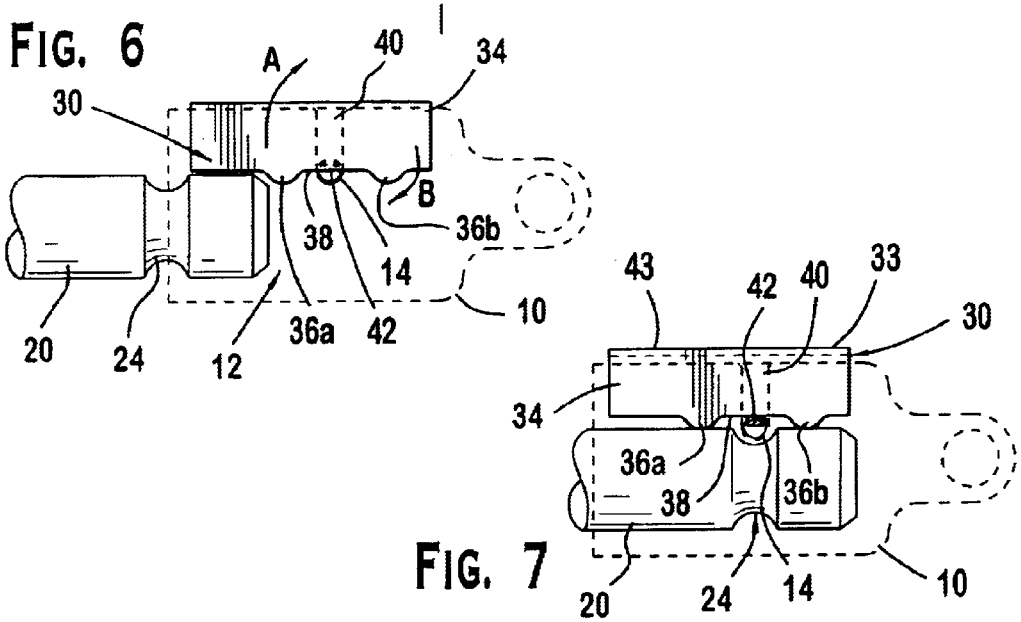

SHAFT ASSEMBLY SAFETY MECHANISM

BACKGROUND

The present invention relates to shaft components. More particularly, the present invention relates to a safety mechanism for reducing the likelihood of an improper shaft assembly.

Shafts are utilized in many applications and generally require interconnection between the shaft and a secondary component. The secondary component can be an independent component or secondary shafts such that the shaft serves as an intermediate shaft. In both instances, the forward end 22 of the shaft 20 is interconnected with a coupling element 10 which in turn is interconnected with the secondary component (not shown).

Many different coupling elements can be utilized with the present invention, with an exemplary coupling element 10 illustrated in FIG. 1. The coupling element 10 has a shaft receiving and retaining slot 12 and a retaining bolt 16 or other retainer that is passed through and secured in a through bore 14 in the coupling element 10. Typically, the shaft 20 has a notch, annular groove or other form of bolt receiving recess 24 adjacent the forward end 22 of the shaft 20. The forward end 22 of the shaft 20 is first positioned in the slot 12 (as indicated by the arrow 1 in FIG. 1) with the bolt receiving recess 24 aligned with the through bore 14. Thereafter, the retaining bolt 16 is slid through the through bore 14 and bolt receiving recess 24 (as indicated by the arrow 2 in FIG. 1) and secured by a cotter pin, nut or the like. The retaining bolt 16 extending through the bolt receiving recess 24 permanently secures the shaft 20 to the coupling element 10.

In many applications, for example, a steering intermediate shaft, the interconnection of the shaft 20 and coupling element 10 occurs in a location with limited accessibility. As such, it is difficult to visually or manually check that the retaining bolt 16 is properly received in the bolt receiving recess 24. For example, as illustrated in FIG. 2, the shaft 20 may not be fully inserted into the coupling element slot 12 when the retaining bolt 16 is inserted. As a result, the retaining bolt 16 is not received in the bolt receiving recess 24. In some instances, the forward end 22 of the shaft 20 jams between the inserted retaining bolt 16 and the inner surface 18 of the coupling element slot 12. If the shaft 20 is jammed sufficiently, it may give a rigid feeling to an assembly worker, thereby creating a false sense that the shaft 20 is properly interconnected. After some use, the shaft end 22 may dislodge from between the retaining bolt 16 and slot surface 18, thereby causing disassembly and failure of the coupling.

SUMMARY

The present invention provides a shaft coupling assembly. The coupling assembly comprises a coupling element including a shaft receiving slot and a retainer receiving aperture adjacent the shaft receiving slot; a retainer extendable through the retainer receiving aperture; an axial shaft body configured to be inserted in the coupling element slot and including a retainer receiving recess adjacent the forward shaft end and configured to receive and retain the retainer after the shaft forward end is inserted in the coupling element shaft receiving slot. A safety clip is configured to be retained on the coupling element with a first portion extending toward the shaft receiving slot. The first portion includes a retainer blocking edge and a pair of extensions, one extension positioned on each side of the edge, extending beyond the edge into the shaft receiving slot. The first portion is moveable between an initial position wherein the edge covers a portion of the retainer receiving aperture and a second position wherein the shaft body contacts the extensions and moves the edge such that the retainer receiving aperture is sufficiently clear to receive the retainer.

BRIEF DESCRIPTION OF THE DRAWINGS

FIG. 3 is an isometric view of a safety clip that is a first embodiment of the present invention.

FIG. 4 is an isometric view of a safety clip that is a second embodiment of the present invention.

FIG. 5 is an isometric view of the safety clip of FIG. 1 positioned on a coupling element, the coupling element shown in partial cross section.

FIG. 6 is a side elevation view of the safety positioned on a coupling element, shown in phantom, with a shaft partially inserted into the coupling element.

FIG. 7 is a side elevation view similar to FIG. 6 with the shaft properly inserted into the coupling element.

DETAILED DESCRIPTION OF THE PREFERRED EMBODIMENTS

Figure 1:
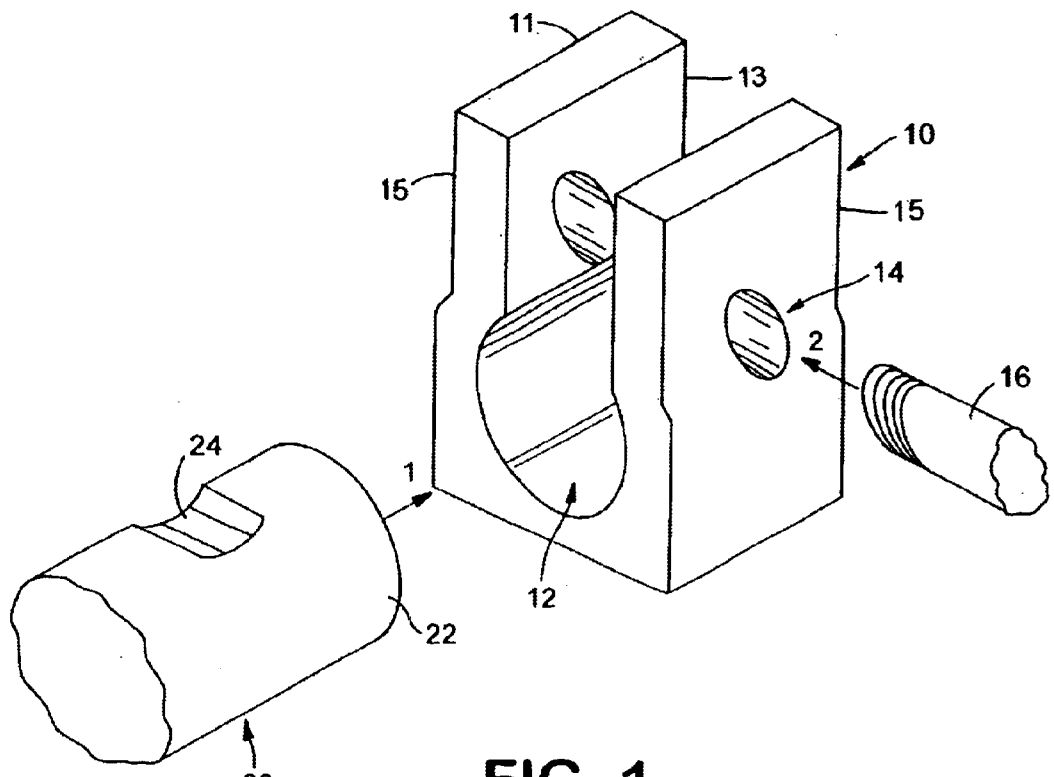
FIG. 1 is an isometric view of a prior art shaft positioned for engagement with an exemplary coupling element.
Figure 2:
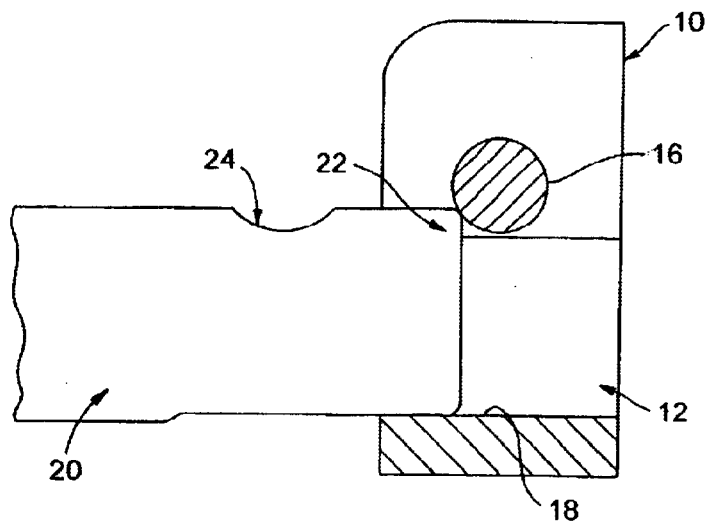
FIG. 2 is a side elevation view, with the coupling element shown in cross section, of a prior art shaft improperly interconnected with the coupling element.

The present invention will be described with reference to the accompanying drawing figures wherein like numbers represent like elements throughout. Certain terminology, for example, "right", "left", "front", "frontward", "forward", "back", "rear" and "rearward", is used in the following description for relative descriptive clarity only and is not intended to be limiting.

Referring to FIG. 3, a safety clip 30 that is a first embodiment of the present invention is shown. The preferred clip 30 includes a flat surface 32 configured to lie on an end surface 11 of the coupling element 10. A first side surface 34 depends from the surface 32 along edge 33 and terminates in a blocking edge 38 positioned between a pair of extensions 36 extending beyond the edge 38. The extensions 36 preferably have a semicircular shape, but may have other configurations as well. As will be described in detail hereinafter, the first side surface 34 is configured to extend into the coupling element slot 12 when the clip 30 is installed. A retainer tab 40 depends from the opposite edge 43 of the surface 32 and preferably terminates in an inward extending portion 42 configured to retain the clip 30 on the coupling element 10, as will be described in more detail hereinafter. The surface 32 illustrated in this first embodiment includes opposed detents 46 to improve the flexibility of the first side surface 34 relative to the retainer tab 40.

Referring to FIG. 4, a retainer clip 30' that is a second embodiment of the present invention is shown. The retainer clip 30' operates substantially the same as the retainer clip 30 of the first embodiment, but illustrates that the surfaces 32 and 34 and the retainer tab 40 may have various configurations. For example, as illustrated, instead of providing substantially rectangular surfaces 32 and 34, clip 30' includes a generally T-shaped surface 32' mating with a tapered depending side surface 34'. Additionally, tab 40' has a larger, rectangular shape configured to extend along the side surface of the coupling element 10. Other variations are also considered, but not illustrated. For example, surface 32 may be provided with a curved surface in an application having a coupling element 10 having a curved end surface 11.

The retainer clip 30 may be manufactured from various materials, for example, metals, plastics, and other natural or synthetic materials and may be manufactured from various techniques, for example, stamping or molding.

Referring to FIGS. 5–7, operation of the preferred safety clip 30 will be described. As shown in FIG. 5, the clip 30 is positioned about one of the ears 15 of the coupling element 10 such that the first side surface 34 extends along an inside surface of the ear 15 toward the slot 12. Surface 32 extends along the ear end surface 11 and the retainer tab extending portion 42 is received in the through bore 14 to retain the clip in position. An advantage of the retainer tab 40 extending into the bore 14 is that it prevents the bolt 16 or other retainer from being inserted into the coupling element 10 from the incorrect side.

Referring to FIG. 6, in the initial, unbiased position shown, the first side surface 34 extends into the slot 12 a distance such that the blocking edge 38 covers a portion of the through bore 14. In this position, if an operator attempts to insert a bolt 16 or other retainer through the bore 14, the bolt 16 or retainer will contact the blocking edge 38 and be prevented from premature securement in the coupling element 10. The inability to fully insert the bolt 16 will signal the operator that the shaft 20 is not properly positioned.

To properly secure a shaft 20 in the coupling element 10, the shaft 20 is inserted into the slot 12. As the shaft 20 is initially inserted (see FIG. 6), its leading edge contacts the first clip projection 36a, but such contact is not sufficient to move the blocking edge 38 from its position covering the bore 14. Instead, as the shaft 20 contacts the first projection 36a, the clip 30 forward edge rotates up in the direction of arrow A, however, such rotative force causes the rear edge of the clip 30 to rotate downward in the direction of arrow B. As such, the blocking edge 38 remains covering a portion of the bore 14.

Referring to FIG. 7, once the shaft 20 is inserted sufficiently that the receiving recess 24 is aligned with the through bore 14, the shaft 20 is in contact with both the front and rear projections 36a and 36b. As such, the first side surface 34 is pushed upward a distance of the projections 36. The distance of the projections 36 beyond the blocking edge 38 is sufficient to move the blocking edge 38 beyond the through bore 14 such that the through bore 14 is sufficiently clear to receive the bolt 16 or other retainer. In the event the shaft 20 is inserted too far (not shown), the shaft 20 itself will block the through bore 14, thereby preventing improper insertion of the bolt 16 or other retainer.

It will be appreciated by those skilled in the art that changes can be made to the embodiments described above without departing from the broad inventive concept thereof. It is understood, therefore, that this invention is not limited to the particular embodiments disclosed.

What is claimed is:

1. A shaft coupling assembly comprising:
   a coupling element including a shaft receiving slot and a retainer receiving aperture, having a given through clearance, adjacent the shaft receiving slot;
   a retainer extendable through the retainer receiving aperture;
   an axial shaft body terminating in a forward end configured to be inserted in the coupling element slot and including a retainer receiving recess adjacent the forward shaft end and configured to receive and retain the retainer after the shaft forward end is inserted in the coupling element shaft receiving slot; and
   a safety clip configured to be retained on the coupling element with a first portion extending toward the shaft receiving slot, the first portion including a retainer blocking edge and a pair of extensions, one extension positioned on each side of the edge, extending beyond the edge into the shaft receiving slot,
   the first portion moveable between an initial position wherein the edge covers a portion of the retainer receiving aperture such that the retainer receiving aperture bas a reduced through clearance and a second position wherein the edge is substantially clear of the retainer receiving aperture.

2. A shaft coupling assembly comprising:
   a coupling element including a shaft receiving slot and a retainer receiving aperture adjacent the shaft receiving slot;
   a retainer extendable through the retainer receiving aperture;
   an axial shaft body terminating in a forward end configured to be inserted in the coupling element slot and including a retainer receiving recess adjacent the forward shaft end, and configured to receive and retain the retainer after the shaft forward end is inset in the coupling element shaft receiving slot; and
   a safety clip configured to be retained on the coupling element with a first portion extending toward the shaft receiving slot, the first portion including a retainer blocking edge and pair of extensions, one extension positioned on each side of the edge, extending beyond the edge into the shaft receiving slot,
   the first portion moveable between an initial position wherein the edge covers a portion of the retainer receiving aperture and a second position wherein the edge is substantially clear of the retainer receiving aperture and wherein insertion of the shaft body into the coupling element slot causes the first portion to move from the first position to the second position.

3. The shaft coupling assembly of claim 1 wherein each extension has a semi-circular shape.

4. The shaft coupling assembly of claim 1 wherein the safety clip includes a retainer tab configured to retain the safety clip on the coupling element.

5. The shaft coupling assembly of claim 4 wherein the retainer tab includes a portion configured to extend into the retainer receiving aperture.

6. The shaft coupling assembly of claim 1 wherein the safety clip includes a surface including a first side from which the first portion depends.

7. The shaft coupling assembly of claim 6 wherein the safety clip further includes a retainer tab extending from a second, opposite side of the surface.

8. The shaft coupling assembly of claim 7 wherein the surface has a generally rectangular shape extending between the first and second sides.

9. The shaft coupling assembly of claim 8 wherein the rectangular surface has first and second ends extending between the first and second sides and a detent extends into the surface from each end.

10. A shaft coupling assembly comprising:
    a coupling element including a shaft receiving slot and a retainer receiving aperture adjacent the shaft receiving slot;
    a retainer extendable through the retainer receiving aperture;

an axial shaft body terminating in a forward end configured to be inserted in the coupling element slot and including a retainer receiving recess adjacent the forward shaft end and configured to receive and retain the retainer after the shaft forward end is inserted in the coupling element shaft receiving slot; and a safety clip configured to be retained on the coupling element with a first portion extending toward the shaft receiving slot, the first portion including a retainer blocking edge and a pair of extensions, one extension positioned on each side of the edge, extending beyond the edge into the shaft receiving slot, the first portion moveable between an initial position wherein the edge covers a portion of the retainer receiving aperture and a second position wherein the edge is substantially clear of the retainer receiving aperture and wherein the safety clip includes a surface including a first side from which the first portion depends and a retainer tab extending from a second opposite side of the surface, the surface having a generally T-shaped configuration extending between the first and second sides.

11. The shaft coupling assembly of claim 6 wherein the surface has a curved configuration.

12. The shaft coupling assembly of claim 1 wherein the first portion has a tapered shape terminating in the edge and extensions.

* * * * *

UNITED STATES PATENT AND TRADEMARK OFFICE
CERTIFICATE OF CORRECTION

PATENT NO. : 6,739,790 B1
DATED : May 25, 2004
INVENTOR(S) : Walter Crudele

It is certified that error appears in the above-identified patent and that said Letters Patent is hereby corrected as shown below:

Column 4,
Line 13, delete "bas" and replace with -- has --.
Line 26, delete "inset" and replace with -- inserted --.

Column 6,
Line 4, after "second" insert -- , --.

Signed and Sealed this

Eighth Day of March, 2005

JON W. DUDAS
*Director of the United States Patent and Trademark Office*